(12) United States Patent
Kunze

(10) Patent No.: US 6,397,625 B1
(45) Date of Patent: Jun. 4, 2002

(54) ABSORPTION REFRIGERATION MACHINE

(75) Inventor: Gerhard Kunze, Wolfsgraben (AT)

(73) Assignee: Solarfrost International Ltd., Tortola (VG)

( * ) Notice: Subject to any disclaimer, the term of this patent is extended or adjusted under 35 U.S.C. 154(b) by 0 days.

(21) Appl. No.: 09/786,625

(22) PCT Filed: Sep. 3, 1999

(86) PCT No.: PCT/AT99/00213

§ 371 (c)(1),
(2), (4) Date: Mar. 13, 2001

(87) PCT Pub. No.: WO00/14458

PCT Pub. Date: Mar. 16, 2000

(30) Foreign Application Priority Data

Sep. 4, 1998 (AT) .............................................. 1504/98
May 19, 1999 (AT) .............................................. 889/99

(51) Int. Cl.⁷ ................................................. F25B 15/10
(52) U.S. Cl. ............................. 62/476; 62/483; 62/487; 62/101; 62/147; 417/208
(58) Field of Search .......................... 62/476, 472, 478, 62/481, 483, 486, 487, 101, 147, 148; 417/65, 208

(56) References Cited

U.S. PATENT DOCUMENTS

| | | | |
|---|---|---|---|
| 2,274,660 A | | 3/1942 | Brace |
| 2,278,661 A | | 4/1942 | Lenning et al. |
| 2,772,544 A | | 12/1956 | Lenning |
| 3,782,134 A | * | 1/1974 | Meess et al. .................. 62/476 |
| 4,320,629 A | * | 3/1982 | Nakagawa et al. ........... 62/198 |
| 4,322,952 A | * | 4/1982 | Nakagawa et al. ........... 62/198 |
| 4,340,404 A | * | 7/1982 | Oonishi et al. ................ 62/198 |
| 5,291,754 A | * | 3/1994 | Stierlin ......................... 62/487 |
| 5,377,494 A | * | 1/1995 | Takagi et al. ................. 62/102 |
| 5,865,039 A | * | 2/1999 | Muller et al. ................. 62/490 |

FOREIGN PATENT DOCUMENTS

| | | |
|---|---|---|
| CH | 454 192 A | 6/1968 |
| CH | 475 527 A | 7/1969 |
| CH | 558 922 A | 2/1975 |
| DE | 481 607 C | 8/1929 |
| DE | 534 091 C | 10/1931 |
| DE | 621 239 C | 11/1935 |
| DE | 10 89 787 B | 9/1960 |
| DE | 11 32 161 B | 6/1962 |
| EP | 0 837 294 A | 4/1998 |
| FR | 772 935 A | 11/1934 |
| FR | 839 530 A | 4/1939 |
| GB | 888 601 A | 1/1962 |

\* cited by examiner

*Primary Examiner*—William Doerrler
*Assistant Examiner*—Melvin Jones
(74) *Attorney, Agent, or Firm*—Henry M. Feiereisen

(57) ABSTRACT

The invention relates to an absorption refrigeration machine using the Platen-Munters system and comprising a generator (7) for evaporating a refrigerant in a solvent, a solvent separator (2) in which the solvent is separated from the refrigerant; a condenser (3) for liquefying the refrigerant; an evaporator (4) in which the refrigerant is evaporated using a dry gas while beeing cooled; possibly a first gas heat exchanger (6); and an absorber (5) in which the evaporated refrigerant is added to the depleted mixture of refrigerant and solvent which is then again evaporated in the generator (7). The output of the evaporator (4) or the output of the first gas heat exchanger (6) which is possibly positioned downstream of the evaporator (4) and the output of the generator (7) discharge into a bypass (8) connected to the absorber (5). The mixture of evaporated refrigerant and dry gas which arrives from the evaporator (4) via the first gas heat exchanger (6) is transferred to the generator output and from there into the bypass (8), where the gas mixture is brought into contact with the hot, partly, degassed solution coming from the generator (7) and withdraws further refrigerant from same.

18 Claims, 4 Drawing Sheets

ABSORPTION REFRIGERATION MACHINE

The invention relates to an absorption refrigeration machine according to the Platen-Munters system, with a generator for evaporating a refrigerant in a solvent, a solvent separator in which the separation of the solvent from the refrigerant is performed, a condenser for liquefying the refrigerant, an evaporator in which the refrigerant is evaporated using a dry gas while being cooled, optionally with a first gas heat exchanger, and an absorber in which the evaporated refrigerant is added to the depleted mixture of refrigerant and solvent which is then again evaporated in the generator.

To operate a known absorption refrigeration machine according to the Platen-Munters system it is necessary to have a heat source with a temperature far in excess of 100 degrees Celsius. At temperatures of 100 degrees Celsius and below the efficiency tends towards zero. Existing heat sources with low temperatures such as hot water from industrial waste heat system such as long-distance heating, solar heating or the like are not suitable for the conventional designs of said absorption refrigeration machines because the required high temperatures can generally not be achieved.

SUMMARY OF THE INVENTION

It is therefore an object of the present invention to provide an absorption refrigeration machine of the kind mentioned above with which it is possible to achieve a high efficiency even at relatively low temperatures, preferably at approx. 75 degrees Celsius.

This is achieved in accordance with the invention in such a way that the output of the evaporator or the output of the optional first gas heat exchanger which is arranged downstream of the evaporator and the output of the generator open into a bypass leading into the absorber, with the mixture consisting of evaporated refrigerant and dry gas which arrives from the evaporator via the first gas heat exchanger being transferred to the output of the generator and from there into the bypass where the gas mixture is brought into contact with the hot, partially degassed solution coming from the generator and withdraws further refrigerant from the same.

The mixture arriving from the evaporator via the first gas heat exchanger is therefore not transferred directly to the absorber, but instead to the output of the generator and from there through the bypass and withdraws refrigerant from the solution arriving from the generator. It is also possible to omit the first gas heat exchanger, so that in this case the mixture is guided from the output of the evaporator to the bypass input. It is possible in both cases to achieve a low solution concentration in the area of the absorber input which is a precondition for a low refrigerating temperature without requiring that the generator be strongly heated. Heat sources of low temperature can therefore be used for the absorption refrigeration machine in accordance with the invention. As a result of the low generator temperature, the quantity of the simultaneously evaporated water is reduced, thus avoiding any losses in efficiency in the evaporator.

In a further development of the invention it may be provided that a second gas heat exchanger is provided whose primary side is disposed between the output of the evaporator or, optionally, the output of the first gas heat exchanger and the input of the bypass and whose secondary side is disposed between the output of the bypass and the input of the absorber, so that the gas mixture arriving from the bypass is cooled. The cooling of the gas mixture allows improving the enrichment of the depleted mixture arriving from the generator.

The bypass allows a low operating temperature, but also causes energy loss. According to a further embodiment of the invention it can be provided that a control valve is arranged between the output of the evaporator and the input of the absorber or between the input and the output of the bypass with which the quantity of the gas can be metered which is rerouted through the bypass, with the part not rerouted flowing directly to the absorber. This ensures a regulation of the bypass effect on the momentarily required temperature reduction of the supplying heat source.

According to a variant of the invention, the control valve can be a straight-through valve which short-circuits the bypass, as a result of which the bypass becomes ineffective when the valve is opened and the bypass can be fully effective when the valve is closed.

According to a further variant of the invention the control valve can be a three-way valve which divides the gas mixture arriving from the evaporator between the flow to the bypass and the flow to the absorber. As a result, the bypass can be set very precisely in its effect.

In order to increase the contact surface between the gas mixture flowing through the bypass and the liquid flowing through the same, the interior wall of the bypass tube can be coated with an ammonia-resistant fiber material, with the ammonia-resistant fiber material preferably being formed by a glass-fiber web which fulfills the requirements placed on a large surface and high durability.

A further feature of the invention can be that in the interior of the bypass tube there is arranged a coil spring resting on the interior wall thereof, with the ammonia-resistant fiber material being tensioned between the interior wall and the coil spring.

It is prevented in this way that the bypass flow cross section decreases for the gas flowing through the bypass.

A particularly high efficiency is achieved in accordance with a further embodiment of the invention in such a way that the refrigerant is formed by ammonia and the solvent by water.

It can further be provided that the bypass is heatable, thus making the bypass temperature adjustable to a value in which the inflowing gas mixture withdraws a very high share of ammonia from the depleted solution.

The invention relates further to a bubble pump for an absorption refrigeration machine with at least one vertical pump tube which is heatable by a liquid or gaseous heat carrier medium and in which a refrigerant solution can be moved upwardly by bubble formation.

The liquid circulation in absorption refrigeration machines is often maintained by so-called "mammoth" or "bubble pumps", e.g. in the classical system of Platen-Munters in which water is used as solvent and ammonia as refrigerant. As the energy of a heat source can be taken for the operation of such an absorption refrigeration machine, it is outstandingly suitable for the conversion of solar power into cold. Conventional bubble pumps are not or only badly suited for the heating by heat carrier media with variable temperature as occurs in the winning of solar power.

Such a bubble pump consists of two mutually communicating vessels which are filled with a hydrous ammonia solution. One of these vessels, namely the active part of the pump, is arranged as a small upwardly striving tube which is heated, so that ammonia is released in its interior. The produced gas bubbles drive the solution upward in the narrow tube. In some bubble pumps one can find a small gas collecting vessel in the lower part of the upwardly striving tube in which the tube penetrates from above. The gas collects there before it upwardly pushes the liquid in the tube situated above.

In the two aforementioned types of bubble pumps there is a critical low temperature range in which the gas bubbles will form so slowly that they are too small to fill the entire cross section of the pump tube and will therefore migrate upwardly without entraining any liquid. The ammonia concentration will thus decrease in the pump tube. According to the thermodynamic data of ammonia solution in water, the temperature at which ammonia can be released will then rise. In the case of a slow rise in the temperature of the pump the required minimum temperature will thus rise simultaneously and situations can occur in which the bubble pump will consistently fail to operate because the pump tube only contains water and hardly any more ammonia. The aforementioned gas collecting vessel is provided to reduce this danger. Particularly in the application of solar power a temperature progress over time occasionally still occurs in which bubble pumps with gas collecting vessels will still fail to operate as a result of the aforementioned effect. In the case of an excessively slow starting or cooling process the refrigerant solution can lose too much gas and the bubble pump can thus be put out of operation permanently.

This problem can also occur in gas-heated ammonia absorption refrigeration machines, e.g. when the gas burner is clogged. The pump can only be reactivated when the entire refrigerator has been turned upside down, as a result of which ammonia-rich solution reaches the pump tube again. This process is not viable in large-size refrigerators, which is why large size refrigerating units are usually not equipped with bubble pumps but with electric conveying pumps.

In permanent operation, an optimal degree of refrigerating effect requires a precise dosage of the pump's output independent of the heating temperature.

It is therefore the object of the present invention to provide a bubble pump of the kind mentioned above with which a failure of the bubble pump in the critical temperature range is avoided and with which a permanent operation of an absorption refrigeration machine is enabled.

This is achieved in accordance with the invention in such a way that the lower end of the at least one pump tube is connected with an oblong heatable pump triggering vessel, which pump triggering vessel is provided with an inlet and an outlet opening and from which the refrigerant solution flowing into the pump tube can be flowed through in a substantially horizontal direction, with the inlet and the outlet opening being arranged in such a way that a gas bubble produced in the pump triggering vessel is held back in the same, with the liquid level of the refrigerant solution in the cold state being below the active pumping range of the pump tube.

Prior to the entrance of the refrigerant solution into the pump tube the same is mostly located in the pump triggering vessel which is heated with a temperature which is always slightly below the actual bubble pump heating temperature. Once the heating temperature rises, a gas bubble is formed in the aforementioned pump triggering vessel, which gas bubble, due to the shape of the vessel, cannot flow off and therefore displaces the solution, so that its liquid level rises up to the currently hot pump tube, so that the pump process is triggered. If the temperature reaches the critical range on the other hand, e.g. where only very little ammonia is released, the pump triggering vessel is already so cool that the ammonia goes into solution, the gas bubble will disappear, and the solution will withdraw from the bubble pump. This is an important difference to the directly heated gas collecting vessels as are known in this connection and into which the pump tube immerses, because no condensation of the gas bubble can occur there as long as the temperature in the active range of the bubble pump still lies above the minimum gas exhalation temperature. A further difference is that the pump triggering vessel is preferably present in the form of a lying tube or any other, surface-enlarging form through which the refrigerant solution flows through the vessel as a thin floor layer below the gas bubble and swirls in the process, thus then enabling the complete reabsorption of the bubble on cooling, because in the case of a non-swirled liquid, as in the conventional gas collecting vessel, a thin layer of the specifically far lighter liquid ammonia will form on the surface which prevents any further solution process. In the bubble pump in accordance with the invention the refrigerant solution is thus automatically removed from the same when the heating temperature decreases to the critical range. On the other hand, the ammonia-water solution can only be located in the active area of the bubble pump at temperatures above the minimum gas exhalation temperature corresponding to the respective system pressure.

It may be provided for in a further embodiment of the invention that the pump triggering vessel is formed by a horizontally arranged hollow cylinder with cover surfaces, with the inlet and outlet opening being provided in the lower zone of the opposite cover surfaces.

As a result, the gas bubble which is produced automatically in case of heating is prevented from escaping through the outlet opening.

According to a further embodiment of the invention it may be provided that the pump triggering vessel is enclosed by a heating jacket through which a liquid or gaseous heat carrier medium can be conducted. This allows fixing the temperature of the pump triggering vessel irrespective of the temperature in the bubble pump, with a continuously slightly lower temperature than the temperature prevailing in the bubble pump being consistently chosen, so that the critical temperature range is reached within the pump triggering vessel already before this and the contracting gas bubble pulls back the refrigerant solution from the pump tube.

It can therefore be provided according to a further embodiment of the invention that the required small temperature difference between the bubble pump and the pump triggering vessel is achieved in such a way that the heating heat carrier medium flows at first through the bubble pump and then through the pump triggering vessel.

According to a further alternative embodiment of the invention, the pump tube can be enclosed by a first concentric heating jacket for flowing through with a liquid or gaseous heat carrier medium and a second concentric heating jacket for a liquid heat carrier medium can be arranged between the pump tube and the first concentric heating jacket, with the liquid level of said liquid heat carrier medium being adjustable within the second concentric heating jacket.

In this way it is possible to adjust the entire thermal resistance of the vessel forming the bubble pump in accordance with the invention to the required heat flow. Furthermore, the heat supply to the pump tube can be regulated independent of the temperature of the heat carrier medium flowing through the first concentric heating jacket.

In absorption refrigeration machines with a generator, an absorber and a condenser it is possible, in a further embodiment of the invention, to arrange a temperature sensor on the connecting tube between the generator and the absorber or on the connecting tube between the generator and the condenser and provide a controller unit with which the pump output can be controlled depending on the temperature measured by the sensor.

Measurements in absorption refrigeration machines and precise calculations prove that the degree of refrigerating effect is only optimal when the pump output of the bubble pump is constant. The pump output fluctuates strongly, however, in the case of variable heating temperature in the case of solar power.

The necessary control of the pump output can occur in such a way that the heat energy supplied to the bubble pump can be controlled independently of the temperature, which is controllable both by a variable contact surface between the heat carrier medium coming from the solar unit and the pump tube of the bubble pump as well as by the change of the heat transmission coefficient at this place.

According to a further embodiment of the invention there is an additional possibility to control the heat transmission coefficient into the bubble pump by changing the flow speed of the heat carrier medium. Since the heat transmission coefficient between a medium and a solid body will rise with the flow speed of this medium and the heat carrier medium needs to be circulated in any case, such a control of the heat transmission coefficient can be coupled in a preferable manner with a control of the flow speed of the heat carrier liquid.

Preferably, the temperature progression between generator and absorber or between generator and condenser of the refrigerating system can be used as a quantity for the pump output, because a larger pump output will shift the range of the higher temperatures closer to the absorber or condenser.

A further feature of the invention can be that the second concentric heating jacket is connected with a gas thermometer by means of whose gas, which expands when heated, the liquid level can be adjusted within the second concentric heating jacket. The gas expanding on heating displaces the liquid from the variable heating jacket about the bubble pump tube which is representative of the variable thermal resistance.

Preferably, the position of the gas thermometer represents the possibility for adjusting the pump output. If the gas thermometer is displaced closer to the absorber or closer to the condenser where the contact surface of the tube is colder, the heating jacket about the bubble pump will enlarge automatically and it will pump more strongly. If, on the other hand, the heating temperature of the pump rises, it will pump quicker and the temperature in the gas thermometer will rise, thus displacing liquid from the heating jacket and braking the pump.

BRIEF DESCRIPTION OF THE DRAWING

The invention is now explained in closer detail by reference to the enclosed drawings, wherein.

DETAILED DESCRIPTION OF PREFERRED EMBODIMENTS

Figure 1:
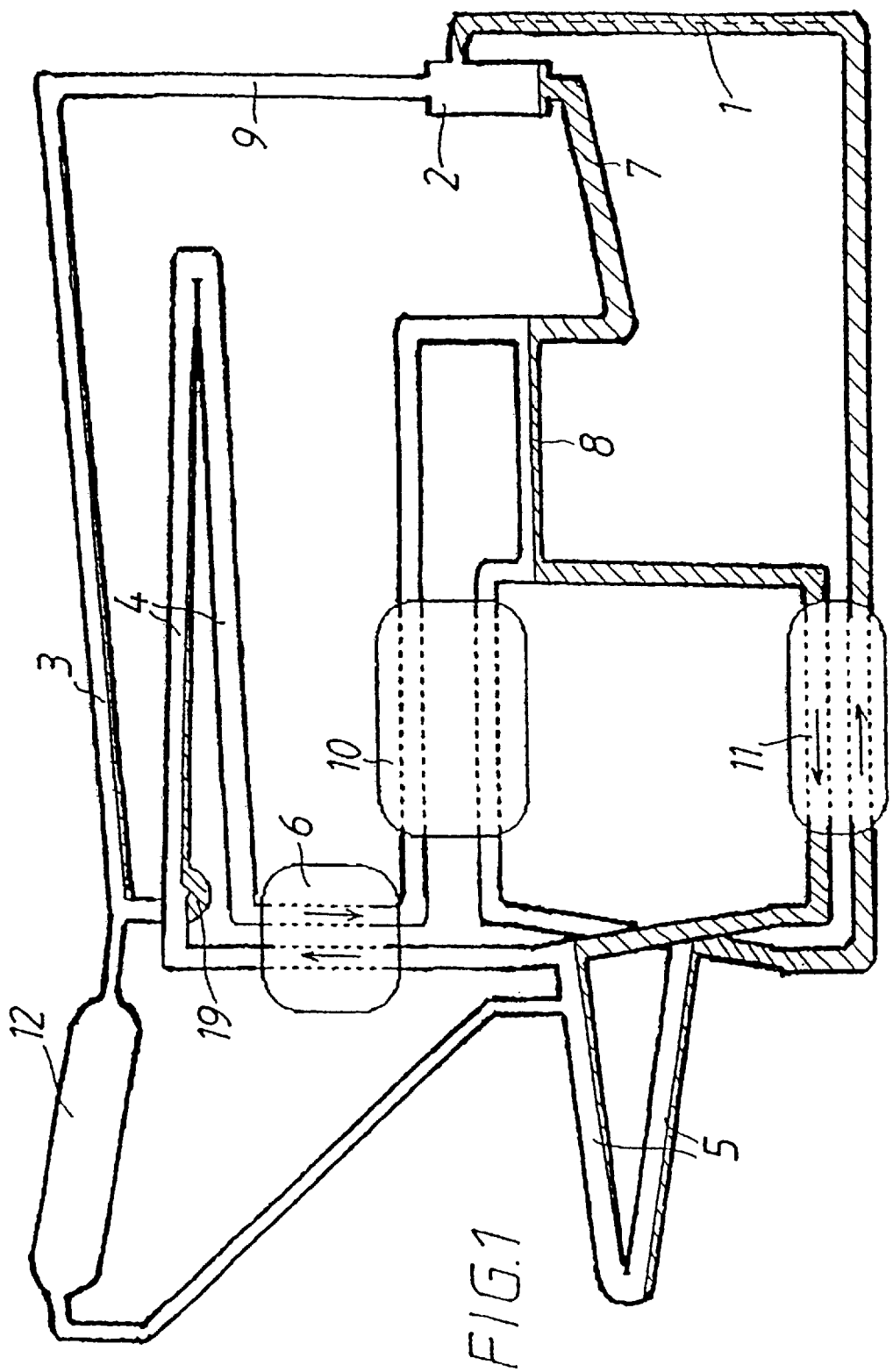
FIG. 1 shows a schematic representation of an embodiment of the absorption refrigeration machine in accordance with the invention.

The absorption refrigeration machine as described below operates substantially like the classical system of Platen and Munters, which is used, inter alia, in the absorber refrigerator of Elektrolux® and Servel® and has been documented in numerous ways.

The absorption refrigeration machine comprises a generator 7 to evaporate a refrigerant dissolved in a solvent with a bubble pump 1, a solvent separator 2 in which the separation of the solvent from the refrigerant is performed, a condenser 3 to liquefy the refrigerant, an evaporator 4 in which the refrigerant is evaporated by means of dry gas and by cooling, a first gas heat exchanger 6 and an absorber 5 in which the evaporated refrigerant is supplied to the depleted mixture of refrigerant and solvent, which mixture is evaporated again in the generator 7.

For the purpose of easier understanding, the invention will be explained by reference to an embodiment in which the solvent is formed by water and the refrigerant by ammonia. Within the scope of the present invention it would also be possible to use other suitable solvents and refrigerants.

It is provided for in accordance with the invention that the output of the first gas heat exchanger 6 arranged downstream of the evaporator 4 and the output of the generator 7 open into a bypass 8 leading to the absorber 5, with the mixture of evaporated refrigerant and dry gas coming from the evaporator 4 via the first gas heat exchanger 6 being guided to the output of generator 7 and from there through the bypass 8 where the gas mixture is brought into contact with the hot, partly degassed solution coming from the generator 7 and withdraws further refrigerant from the same.

The absorption refrigeration machine can be operated as a result with a relatively low generator heating temperature which can be below 100 degrees Celsius.

It is also possible to omit the first gas heat exchanger 6, in the case of which the output of evaporator 4 opens directly into the bypass 8.

In the bubble pump 1, which in the illustrated embodiment is formed by one or several parallel or vertical tubes, a concentrated solution of ammonia is supplied with heat if the heat coming from the heat exchanger 1 is insufficient, as a result of which ammonia gas bubbles form in the bubble pump 1 whose volume is only a few percent in comparison to the total gas quantity which will be released subsequently in generator 7. The rising ammonia gas bubbles guide the solution upwardly through the thin tubes to a water separator 2. The ammonia separated from the water flows through an ascending tube 9 further upwardly to a condenser 3 where it is liquefied by refrigeration. The liquid ammonia flows through a U-tube 19 downwardly to evaporator 4 where it wets, as a thin film, the wall of a tube through which a dry gas flows such hydrogen gas. Any ammonia vapors produced thereby are continuously carried off, which leads to a cooling of the evaporator 4, as a result of which the actual refrigerating process of the machine in accordance with the invention is maintained. The mixture of ammonia gas and hydrogen at the lower end of the evaporator 4 is specifically heavier than the gas mixture which is to be enriched and flows into the evaporator 4, as a result of which the hydrogen circulation is kept going.

In a conventional system the gas mixture would continue to flow directly to the absorber 5. In the refrigeration absorption machine, however, it branches off after a first gas heat exchanger 6 in the direction towards the generator 7, where in a bypass 8 it withdraws further ammonia in co-current or counter-current flow from the hot, partly degassed solution coming from the generator 7 as a result of the temperature- and concentration-induced vapor pressure conditions.

Notice must be taken that the increasingly heavier gas must not be raised too high because this could reduce its flow speed.

In this way it is possible to achieve a low concentration of the solution in the upper part of absorber 5 which is a precondition for a low refrigerating temperature without needing to strongly heat the generator 7. As a result of this lower generator temperature the quantity of the simultaneously evaporated water is limited, thus making unnecessary any subsequent rectification of the water-ammonia vapor mixture in ascending tube 9 and avoiding any later loss of efficiency by water in the evaporator.

The mixture of ammonia gas and hydrogen coming via the evaporator and, optionally, via the first gas heat exchanger 6 is additionally guided, as is illustrated in FIG. 1, via the primary side of a second gas heat exchanger 10 to the output of generator 7 then in co-current or counter-current through bypass 8 and thereafter for cooling through the secondary side of the second gas heat exchanger 10 further to the absorber 5 where it releases its excess ammonia to the weak solution coming from bypass 8.

In this case it is necessary that the absorber 5 is provided with a larger dimensioning than in a conventional system. Because the gas mixture flowing from bypass 8 into the absorber 5 has a higher ammonia vapor pressure than in the conventional Platen-Munters system and flows from below into absorber 5, the solution which flows out of said absorber part has a higher concentration, which later on allows operating the degassing process at a lower temperature in the generator 7. The solution moves from absorber 5 through the liquid heat exchanger 11 to the bubble pump 1. It is raised there and after the water separator 2 the solution which is only slightly weakened by the bubble formation in the bubble pump 1 flows to the generator 7 where the actual degassing process takes place by heating.

A gas pressure expansion vessel 12 disposed between the condenser end 3 and the hydrogen circulation is provided to prevent additional ammonia from reaching the hydrogen circulation in the case of an excessive generator temperature. In said gas pressure expansion vessel 12, the light hydrogen forms a layer on the heavier ammonia, as a result of which only the border layer between the two gases is displaced in the case of temperature fluctuations in the ammonia circulation. Said gas pressure expansion vessel 12 thus prevents the hydrogen from reaching the condenser 3 through the U-tube 19 in the case of low generator temperatures and obstructing the condensation there.

Figure 2:
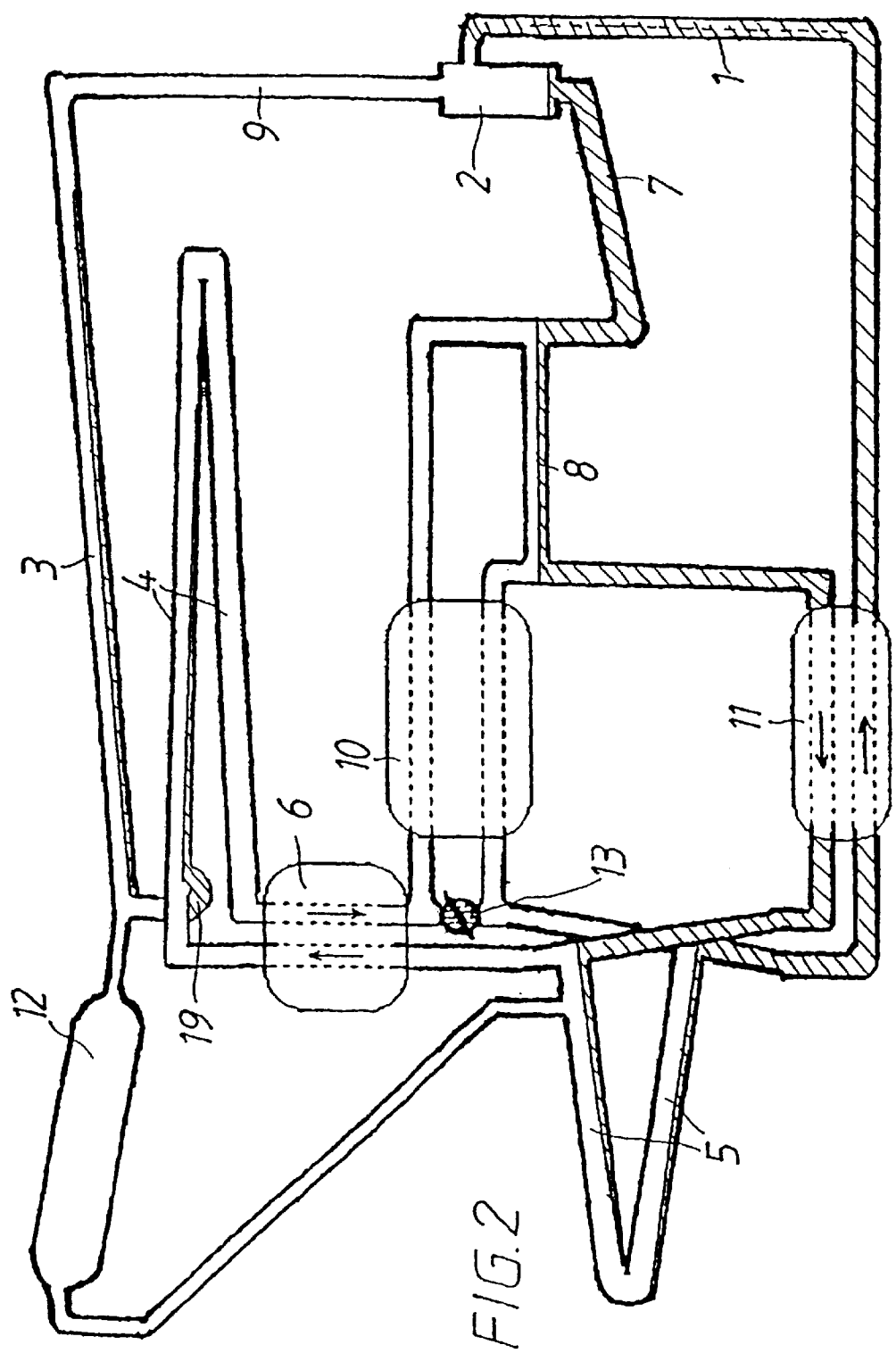
FIG. 2 shows a schematic representation of a further embodiment of the absorption refrigeration machine in accordance with the invention.

In the embodiment according to FIG. 2 the quantity of the gas mixture rerouted to bypass 8 can be dosed via a control valve 13, with the non-rerouted rest flowing directly to the absorber 5, as in the known Platen-Munters system. The control valve can preferably be a straight-through valve representative of a short-circuit of the bypass. Although the bypass 8 allows a lower operating temperature, it uses up energy itself. The control is to be used to set the effect of the bypass for temperature reduction of the supply heat to the bare minimum requirement.

Figure 3:
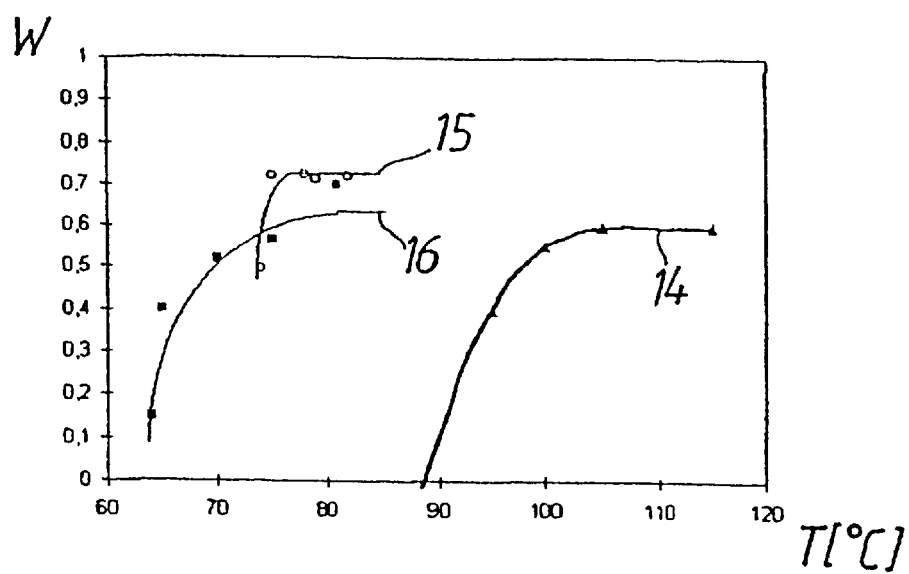
FIG. 3 shows a diagram on experimentally achieved efficiencies of the absorption refrigeration machine in accordance with the invention at different flow temperatures depending on the setting of the bypass control valve.

FIG. 3 shows a diagram of a measured efficiency (axis of the ordinate) of the absorption refrigeration machine in accordance with the invention at a differently strongly controlled bypass and different heating temperatures (axis of the abscisses) for generator 7. Curve 14 shows the efficiency when the bypass is deactivated; curve 15 shows the efficiency when the control valve 13 is set to half the function of the bypass, and curve 16 shows the efficiency at maximum function of the bypass.

Figure 4:
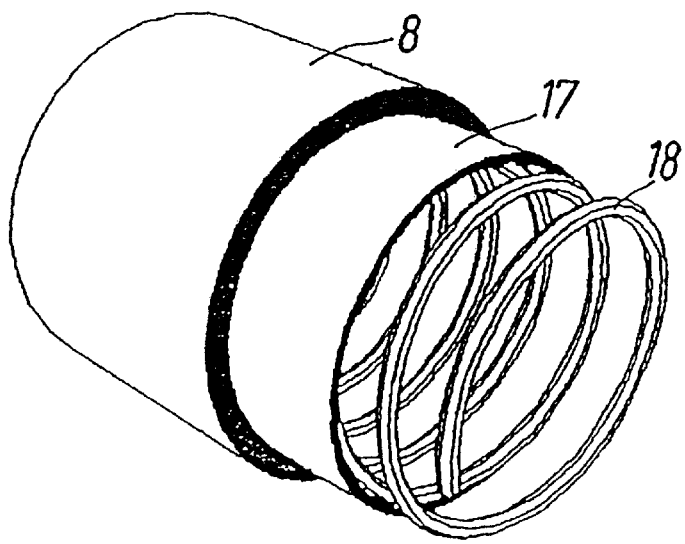
FIG. 4 shows a sectional view through the bypass in an oblique view.

FIG. 4 shows a possible arrangement for increasing the contact surface between the gas mixture and the solution in the bypass 8. A web made of glass fiber or any other similarly ammonia-resistant material with a large surface 17 is preferably pushed by a coil spring 18 against the wall of the bypass tube 8.

Figure 5:
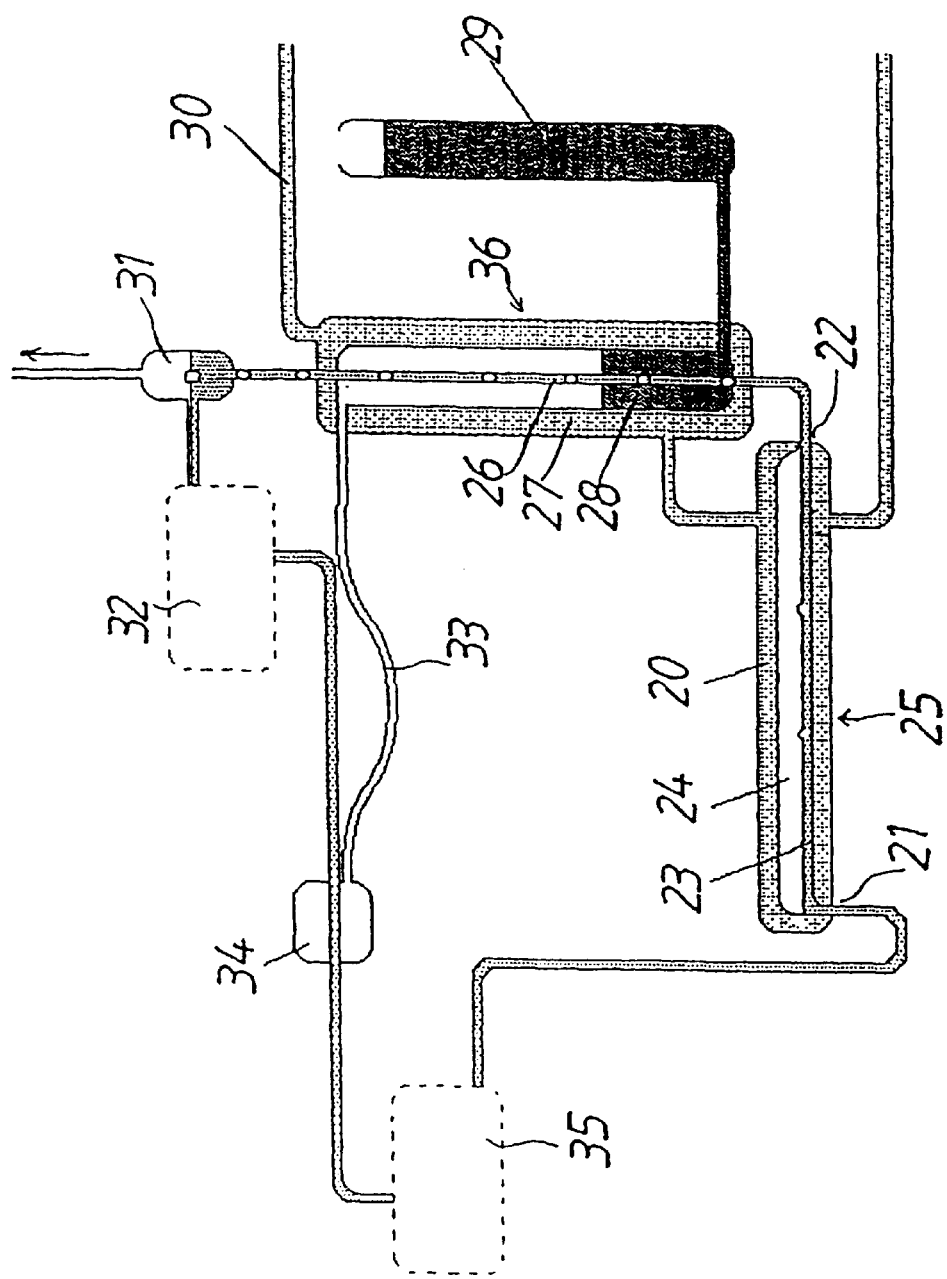
FIG. 5 shows an embodiment of a bubble pump in accordance with the invention.

FIG. 5 shows in schematic form a bubble pump in accordance with the invention. The refrigerant solution coming from a generator 32 via an absorber 35 of an absorption refrigeration machine flows to the lower input of a bubble pump 36 which is provided with a vertical pump tube 26 which can be heated by a liquid or gaseous heat carrier medium and in which the refrigerant solution such as ammonia-water can be moved upwardly by the formation of bubbles. A bypass according to the embodiments shown in the FIGS. 1 to 4 can also be optionally provided. The use of the bubble pump in accordance with the invention offers advantages even in conventional absorption refrigeration machines.

It is provided in accordance with the invention that the lower end of the pump tube 26 is connected with an oblong heatable pump triggering vessel 25 which is provided with an inlet and outlet opening 21, 22 and can be flowed through substantially in the horizontal direction by the refrigerant solution flowing in pump tube 26.

The inlet and outlet openings 21, 22 are arranged in such a way that a gas bubble 24 produced in the pump triggering vessel 25 is held back in the same, with the liquid level of the refrigerant solution 23 being below the active pump range of the pump tube 26 in the cold state.

The pump triggering vessel is formed by a horizontally arranged hollow cylinder 25 with cover surfaces, with the inlet and the outlet opening 21, 22 being provided in the lower zone of the mutually opposite cover surfaces. Any other suitable shaping of the pump triggering vessel is possible.

The gas bubble 24 shown in FIG. 5 presses the liquid level up into the pump tube 26. The solution is further heated there by a heat carrier medium in a first concentric heating jacket 27 via a partly filled second concentric heating jacket 28, as a result of which gas bubbles are produced which convey the liquid to a gas separator 31 from which the partly degassed solution flows back to the generator 32, whereas the gas continues to flow upwardly in the direction towards a condenser (not shown). The heat carrier medium 30 flows first through the outer heating jacket 27 of the bubble pump and from there through a heating jacket 30 of the pump triggering means 25 back to the heat source. A small temperature difference between the bubble pump and the bubble triggering vessel 25 is achieved in such a way that the heat carrier medium to be heated flows at first through the bubble pump and then through the bubble triggering vessel 25. The flow speed of the heat carrier liquid can be adjustable in order to vary the heat flow to the bubble pump.

Furthermore, a temperature sensor can be provided on the connecting tube between the generator 32 and the absorber 35 or on the connecting tube between the generator 32 and the condenser (not shown), as a result of which the pump output can be controlled depending on the temperature as measured by the sensor.

A possible embodiment comprises a gas thermometer 34. It is heated on the conduit between the generator 32 and the absorber 35 and the thus expanding gas displaces via a flexible line 33 heat carrier liquid from the inner heating jacket 28 to a pressure expansion vessel 29, as a result of which the heated surface on the pump tube 26 is reduced. In this way it is possible to set the heat flow through the pump tube 26 as required.

What is claimed is:

1. An absorption refrigeration machine according to the Platen-Munters system, with a generator (7) for evaporating a refrigerant in a solvent, a solvent separator (2) in which the separation of the solvent from the refrigerant is performed, a condenser (3) for liquefying the refrigerant, an evaporator (4) in which the refrigerant is evaporated using a dry gas while being cooled, optionally with a first gas heat exchanger (6), and an absorber (5) in which the evaporated refrigerant is added to the depleted mixture of refrigerant and solvent which is then again evaporated in the generator (7), characterized in that the output of the evaporator (4) or the output of the optional first gas heat exchanger (6) which is arranged downstream of the evaporator (4) and the output of the generator (7) open into a bypass (8) leading into the absorber (5), with the mixture consisting of evaporated refrigerant and dry gas which arrives from the evaporator (4) via the first gas heat exchanger (6) being transferred to the output of the generator and from there through the bypass (8) where the gas mixture is brought into contact with the hot, partially degassed solution coming from the generator (7) and withdraws further refrigerant from the same.

2. An absorption refrigerating machine as claimed in claim 1, characterized in that a second gas heat exchanger (10) is provided whose primary side is disposed between the output of the evaporator (4) or, optionally, the output of the first gas heat exchanger (6) and the input of the bypass (8) and whose secondary side is disposed between the output of the bypass (8) and the input of the absorber (5), so that the gas mixture arriving from the bypass (8) is cooled.

3. An absorption refrigerating machine as claimed in claim 1, characterized in that a control valve (13) is arranged between the output of the evaporator (4) and the input of the absorber (5) or between the input and the output of the bypass (8) with which the quantity of the gas can be metered which is rerouted through the bypass (8), with the part not rerouted flowing directly to the absorber (5).

4. An absorption refrigerating machine as claimed in claim 3, characterized in that the control valve is a straight-through valve (13) short-circuiting the bypass (8).

5. An absorption refrigerating machine as claimed in claim 3, characterized in that the control valve is a three-way valve which divides the gas mixture arriving from the evaporator (4) between the flow to the bypass (8) and the flow to the absorber (5).

6. An absorption refrigerating machine as claimed in claim 1, characterized in that the interior wall of the bypass tube is coated with an ammonia-resistant fiber material (17).

7. An absorption refrigerating machine as claimed in claim 6, characterized in that the ammonia-resistant fiber material is formed by a glass-fiber web (17).

8. An absorption refrigerating machine as claimed in claim 6, characterized in that in the interior of the bypass tube (8) there is arranged a coil spring (18) resting on the interior wall thereof, with the ammonia-resistant fiber material (17) being tensioned between the interior wall and the coil spring (18).

9. An absorption refrigerating machine as claimed in claim 1, characterized in that the refrigerant is formed by ammonia and the solvent by water.

10. An absorption refrigerating machine as claimed in claim 1, characterized in that the bypass (8) is heatable.

11. A bubble pump for an absorption refrigeration machine with at least one vertical pump tube (26) which is heatable by a liquid or gaseous heat carrier medium and in which a refrigerant solution can be moved upwardly by bubble formation, characterized in that the lower end of the at least one pump tube (26) is connected with an oblong heatable pump triggering vessel (25), which pump triggering vessel (25) is provided with an inlet and an outlet opening (21, 22) and the refrigerant solution flowing into the pump tube (26) can be flowed through in the same in a substantially horizontal direction, with the inlet and the outlet opening (21, 22) being arranged in such a way that a gas bubble produced in the pump triggering vessel (25) is held back in the same, with the liquid level of the refrigerant solution in the cold state being below the active pumping range of the pump tube (26).

12. A bubble pump as claimed in claim 11, characterized in that the pump triggering vessel is formed by a horizontally arranged hollow cylinder (25) with cover surfaces, with the inlet and outlet opening (21) being provided in the lower zone of the opposite cover surfaces.

13. A bubble pump as claimed in claim 11, characterized in that the pump triggering vessel (25) is enclosed by a heating jacket (20) through which a liquid or gaseous heat carrier medium can be conducted.

14. A bubble pump as claimed in claim 11, characterized in that the pump tube (26) is enclosed by a first concentric heating jacket (27) for flowing through with a liquid or gaseous heat carrier medium and a second concentric heating jacket (28) for a liquid heat carrier medium is arranged between the pump tube (26) and the first concentric heating jacket (27), with the liquid level of said liquid heat carrier medium being adjustable within the second concentric heating jacket (28).

15. A bubble pump as claimed in claim 14, characterized in that the flow speed of the heat carrier liquid is adjustable.

16. A bubble pump as claimed in claim 13, characterized in that the required small temperature difference between the bubble pump and the pump triggering vessel (25) is achieved in such a way that the heating heat carrier medium flows at first through the bubble pump and then through the pump triggering vessel (25).

17. A bubble pump as claimed in claim 11 for an absorption refrigeration machine with a generator, an absorber and a condenser, characterized in that a temperature sensor is arranged on the connecting tube between the generator (32) and the absorber (35) or on the connecting tube between the generator (32) and the condenser and that a controller unit is provided with which the pump output can be controlled depending on the temperature measured by the sensor.

18. A bubble pump as claimed in claim 17, characterized in that the second concentric heating jacket (28) is connected with a gas thermometer (34), by means of whose gas, which expands when heated, the liquid level can be adjusted within the second concentric heating jacket (28).

* * * * *